US011987462B2

(12) United States Patent
Schniedermeyer

(10) Patent No.: US 11,987,462 B2
(45) Date of Patent: May 21, 2024

(54) SWITCH ASSEMBLY FOR DEVICES FOR HANDLING VALUE DOCUMENTS

(71) Applicant: Wincor Nixdorf International GmbH, Paderborn (DE)

(72) Inventor: Heiko Schniedermeyer, Paderborn (DE)

(73) Assignee: WINCOR NIXDORF INTERNATIONAL GMBH, Paderborn (DE)

( * ) Notice: Subject to any disclaimer, the term of this patent is extended or adjusted under 35 U.S.C. 154(b) by 947 days.

(21) Appl. No.: 16/954,680

(22) PCT Filed: Dec. 20, 2018

(86) PCT No.: PCT/EP2018/086175
§ 371 (c)(1),
(2) Date: Apr. 20, 2021

(87) PCT Pub. No.: WO2019/122114
PCT Pub. Date: Jun. 27, 2019

(65) Prior Publication Data
US 2021/0229943 A1 Jul. 29, 2021

(30) Foreign Application Priority Data
Dec. 22, 2017 (DE) ........................ 102017131208.0

(51) Int. Cl.
*B65H 29/58* (2006.01)
*B65H 3/06* (2006.01)
(Continued)

(52) U.S. Cl.
CPC ........... *B65H 29/58* (2013.01); *B65H 3/0669* (2013.01); *G07D 11/10* (2019.01); *G07D 11/18* (2019.01); *B65H 2403/724* (2013.01)

(58) Field of Classification Search
CPC ................ B65H 29/58; B65H 2404/63; B65H 2404/631; B65H 2404/632; B65H 2404/633; G07D 11/18; B41J 13/009
See application file for complete search history.

(56) References Cited

U.S. PATENT DOCUMENTS 6,547,241 B2 * 4/2003 Yoshida ................ B65H 29/60 271/303
7,316,394 B2 1/2008 Zeltner et al.
(Continued)

FOREIGN PATENT DOCUMENTS

DE 3875725 T2 6/1993
JP 2007084255 A 4/2007

OTHER PUBLICATIONS

International Preliminary Report on Patentability, dated Jun. 23, 2020. Written in German language.
(Continued)

*Primary Examiner* — Jeremy R Severson
(74) *Attorney, Agent, or Firm* — Black McCuskey

(57) ABSTRACT

The invention relates to a switch assembly for a device for handling value documents, comprising a shaft (110) which is rotationally fixed to a switch body (120), said switch body (120) being rotatable about the longitudinal axis of the shaft (110) between a first switch body position (P1) and a second switch body position (P2). The switch assembly additionally comprises a switch lever (130, 131), said shaft (110) being rotatable about its longitudinal axis by means of the switch lever (130, 131), and a solenoid (200) which comprises an armature (210). The solenoid (200) can be actuated such that the armature (210) can be moved between a first armature position (A1) and a second armature position (A2). The switch lever (130, 131) is in engagement with the armature (210) such that the switch lever (130, 131) rotates about the
(Continued)

longitudinal axis of the shaft (110) by means of the movement of the armature.

22 Claims, 7 Drawing Sheets

(51) Int. Cl.

| | |
|---|---|
| ***G07D 11/10*** | (2019.01) |
| ***G07D 11/18*** | (2019.01) |

(56) References Cited

U.S. PATENT DOCUMENTS

| | | | | |
|---|---|---|---|---|
| 9,540,206 | B2 * | 1/2017 | Masuda ................. | B65H 31/02 |
| 2005/0184449 | A1 | 8/2005 | Morimoto et al. | |
| 2005/0254872 | A1 | 11/2005 | Nonaka et al. | |

OTHER PUBLICATIONS

International Search Report, dated Mar. 14, 2019. Written in German language.

* cited by examiner

Section plane

Section plane

SWITCH ASSEMBLY FOR DEVICES FOR HANDLING VALUE DOCUMENTS

BACKGROUND

1. Field

The invention relates to a switch assembly for devices handling valuable documents, for example for automatic teller machines, for automatic safes or for cashier systems. The valuable documents can be in particular banknotes or cheques.

2. Description of Related Prior Art

DE3875725 discloses a method and buffering device for highlighting documents in a pocket. The method and apparatus are for highlighting certain documents being fed into a pocket from the rest of the documents which are already in the pocket. A pocket marker which is moveable between first and second positions relative to documents in the pocket is used to highlight or separate those documents which are associated with a transaction to be proven, for example, from those documents which are associated with transactions which have already been proven when the apparatus is used in an encoder business machine.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The switch assembly comprises a shaft which is connected to a switch body for rotation therewith, wherein the switch body is rotatable about the longitudinal axis of the shaft between a first switch body position and a second switch body position. The shaft is rotatable about its longitudinal axis with the aid of a switch lever. The switch lever is in engagement with an armature of a solenoid, wherein the solenoid can be actuated in such a manner that the armature can be moved between a first armature position and a second armature position such that the movement of the armature causes the switch lever to rotate about the longitudinal axis of the shaft.

Switch assemblies in which the switch bodies are positioned with the aid of solenoids are known from the prior art. When a voltage is applied to a coil arranged in a solenoid housing of the solenoid, current flows through the coil, thus generating a magnetic field. The magnetic field causes the armature to be drawn into the solenoid housing and to be moved in translatory fashion. Said translatory movement of the armature ends at an inner stop in the solenoid housing. The inner stop defines a second armature position which the armature reaches when it is drawn into the solenoid housing and lies against the inner stop. In the second armature position, the armature is held securely by the magnetic field generated by the coil. If the current flow through the coil is interrupted, the armature is released from the second armature position and is moved, for example with the aid of a spring or by gravity, into a dropped first armature position.

The translatory movement of the armature is converted via the switch lever into a rotational movement of the shaft. However, in the solutions known from the prior art, there is frequently not a complete conversion of said predefined rotational movement since, inter alia, the engagement of the switch lever with the armature typically has play. Due to the play and due to manufacturing tolerances of the components, the second switch body position of the switch body, which is fixedly connected to the shaft, in which the switch body is moved by a predefined angle out of the first switch body position, is not always reliably reached. The more the switch body position which is realized differs from the predefined second switch body position, the more the guiding function of the switch body is impaired, which may lead to malfunctions of the device, in particular to jamming of the valuable documents to be processed.

To eliminate the problem, solutions are conceivable in which the position is corrected at the switch assembly.

The switch assembly is linearly displaced, taking tolerances into account, to an extent until the position deviation from the second switch body position is eliminated. The stroke travel of the switch body can be limited here by a mechanical stop in the guiding element, with the switch body being able to reach the stop before the solenoid armature reaches the stop in the solenoid housing. The holding force with which the magnetic field generated by the coil holds the armature in the solenoid housing becomes smaller as the distance between the armature and the stop in the solenoid housing increases. Undesired, undefined functional states may thereby occur.

It is an object of the invention to specify a switch assembly in which it is ensured that the armature of a solenoid used for the drive reliably reaches the mechanical stop in the solenoid housing and the switch body reliably reaches the second switch body position. This object is achieved by a switch assembly having the features of claim 1. Advantageous developments are specified in the dependent claims.

The effect achieved by the switch assembly as claimed in claim 1 is that an elastically deformable element of the switch assembly is deformed at least whenever the switch body has reached the second switch body position and the armature has not yet reached the second armature position. The angle about which the shaft without the provision of the elastically deformable element, i.e. during play-free coupling of the armature of the solenoid to the shaft, has to be rotated further after the switch body has reached the second switch body position and until the armature reaches the second armature position, is also referred to as the compensating angle. In preferred embodiments, said compensating angle can have a value in the range from 0.10 to 3°, preferably in the range from 0.2° to 2°, in particular in the range from 0.2° to 1°, for example from 0.3° to 1°. In other embodiments, the compensating angle can also have a value in the range from 0.01° to 1°, in particular in the range from 0.05° to 0.5°. In another embodiment of the invention, this angle has a value in the range between 3° and 10°, in particular between 5.5° and 7.5°, for example 6.5°. In an alternative embodiment, this angle has a value in the range between so and 15°, in particular between 100 and 13°, for example 11.5°.

It is particularly advantageous if the elastically deformable element is deformed from the time at which the switch body has reached the second switch body position and the armature is still moved further as far as the second armature position. It is thereby ensured that the armature reliably reaches the second armature position after the predefined rotational movement of the shaft is already completely converted.

Furthermore, it is advantageous if the armature in the second armature position reaches a mechanical stop provided in the solenoid. The effect achieved by this is that the armature is reliably held by the magnetic field generated by the coil. In one embodiment of the invention, the force by which the magnet is held in the second position is 3N to 10N, in particular 6N to 7N. In further embodiments, this holding force can correspond to two to three times said specified range limits.

It is particularly advantageous if the switch lever is rotatable on the shaft about a predefined angular range, and if the elastically deformable element is a torsion spring, wherein one end of the torsion spring is connected to the shaft and the other end of the torsion spring is connected to the switch lever. The predefined functional state, in which the switch body is in the second switch body position and the armature is in the second armature position, is thereby reliably reached. In a further advantageous embodiment of the invention, the elastically deformable element is a leaf spring.

In an advantageous embodiment, the elastically deformable element is a torsion bushing which comprises two sleeves which are connected to each other by an elastomer element and are rotatable relative to each other, wherein the first sleeve is connected to the switch lever and the second sleeve is connected to the shaft, and wherein the switch lever is rotatable at least about an angular range or freely. This achieves a robust, yielding connection between the switch lever and the shaft.

In an alternative advantageous embodiment, the shaft is connected to the switch lever in a recess of the switch lever via an elastomer. The elastomer can be produced in particular by a 2-component injection molding method. As a result, only a small construction space is required for the elastic connection of the switch lever to the shaft.

In a further advantageous embodiment of the invention, the elastically deformable element is a torsion disk assembly which comprises two disks which are connected to each other by an elastomer element and are rotatable relative to each other, wherein the first disk is connected to the switch lever and the second disk is connected to the shaft. This achieves a robust, yielding connection between the shaft and the lever, which connection is simply constructed and takes up little construction space.

In a further advantageous embodiment of the invention, the shaft comprises a first shaft part and a second shaft part, wherein the first shaft part and the second shaft part are connected to each other with the aid of the elastically deformable element, preferably with the aid of a spring or with the aid of an elastomer element, and are rotatable relative to each other. The switch lever can be connected here to the first shaft part for rotation therewith. The effect achieved by this is that the predefined functional state, in which the armature is in the second armature position and the switch body is in the second switch body position, can also be achieved in embodiments of the invention, in which the switch lever and the shaft are connected in a form-fitting manner.

In an advantageous embodiment of the invention, the solenoid comprises a solenoid housing, and the switch lever engages in a groove, preferably in an annular groove, of the armature, wherein the elastically deformable element is arranged between the switch lever of the flange of the groove facing away from the stop. It is particularly advantageous if a spacer, in particular a washer, is arranged between the switch lever and the elastically deformable element. The elastically deformable element is preferably a wave washer, a disk spring, an elastomer washer or an 0 ring. In a further advantageous embodiment of the invention, the armature comprises a first and a second section, the switch lever is in engagement with the first section, and the first section and the second section are connected via the elastically deformable element. The effect achieved by these embodiments is that already existing switch structures, in which the switch lever and the shaft are connected to each other fixedly or in a formfitting manner, can be simply and cost-effectively retrofitted. Also in this solution, only a small construction space is required.

In a further advantageous embodiment, the switch body comprises an elastically deformable guiding element which comprises and/or forms the elastically deformable element of the switch arrangement.

It is particularly advantageous if the guiding element comprises at least one elastically deformable switch finger. As a result, no construction space is required in the environment of the switch lever.

Furthermore, it is advantageous if the elastically deformable element presses the switch body against a first stop with a prestress. The prestress can correspond to a force between 1N and 5N, in particular between 2.5N and 3N. The effect achieved by this is that the switch body reliably reaches the first switch body position and is reliably held in this first switch body position.

It is particularly advantageous if the elastically deformable element is arranged and designed in such a manner that, after the prestress has been overcome, a force in the range between 0.05N and 0.15N is necessary per 1 cm stroke of the armature.

BRIEF DESCRIPTION OF THE DRAWINGS

Further features and advantages of the invention emerge from the description below which explains the invention in more detail with reference to exemplary embodiments in conjunction with the attached figures, in which.

DETAILED DESCRIPTION

Figure 1:
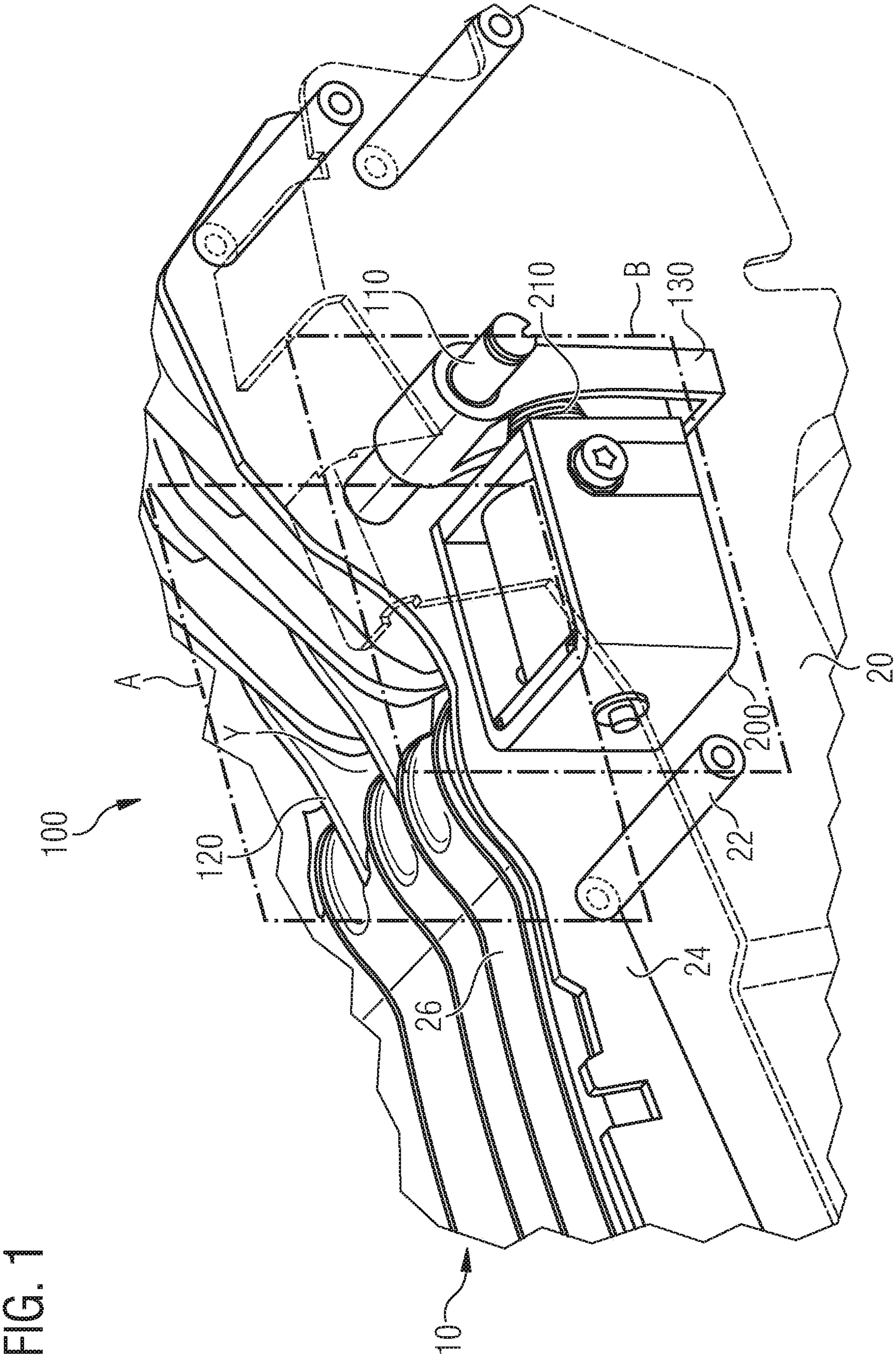
FIG. 1 shows a perspective view of a device for handling valuable documents with a first switch assembly.

FIG. 1 shows a perspective view of a device 10 for handling valuable documents with a first switch assembly 100. The switch assembly 100 comprises a shaft 110, a switch body 120 and a switch lever 130, wherein the shaft 110 is connected to the switch body 120 for rotation therewith. The switch lever 130 is in engagement with an armature 210 of a solenoid 200 such that a movement of the armature 210 causes the switch lever 130 to rotate about the longitudinal axis of the shaft 110.

Figure 2:
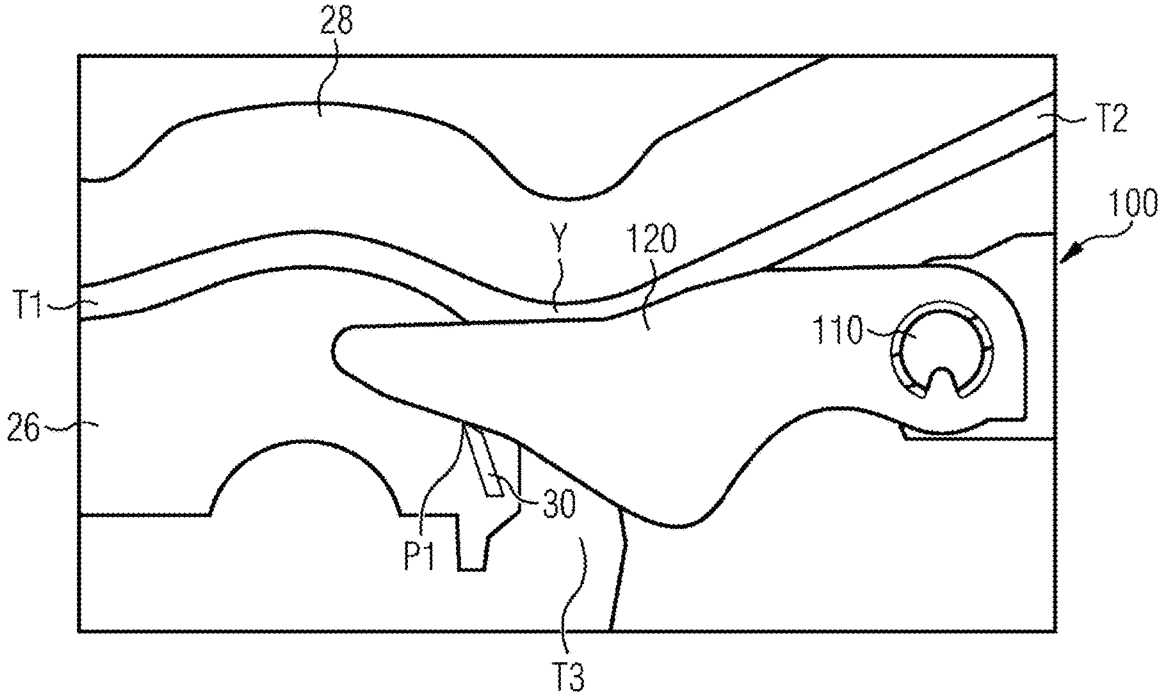
FIG. 2 shows a cutout of a sectional illustration of a switch body of the first switch assembly according to FIG. 1 in a first operating state of the switch assembly.

An outer wall 20 of the device 10 for handling valuable documents accommodates the solenoid 200 and is connected to an inner wall 24 via a bolt 22. The outer wall 20 is illustrated by dashed lines, and the elements located therebehind are illustrated by a solid line. The inner wall 24 accommodates a first guiding element 26 and a second guiding element 28, which is illustrated in FIG. 2, wherein the two guiding elements 26, 28 are arranged opposite each other. The valuable documents are guided between the first guiding element 26 and the second guiding element 28 as far as a switch region Y.

The first guiding element 26 and the second guiding element 28 form a first transport path (T1 in FIG. 2). In the switch region Y, the valuable documents supplied via the guiding elements 26, 28 are guided with the aid of the switch body 120 and, depending on the switch position of the switch body, are guided to a second transport path (T2 in FIG. 2) or to a third transport path (T3 in FIG. 2). By this means, the valuable documents are deflected in the switch region Y.

FIG. 2 shows a cutout of a sectional illustration of the switch body 120 of the first switch assembly 100 according to FIG. 1 along the sectional plane A in a first operating state of the switch assembly 100. The switch body 120 is in a first switch body position P1, in which the switch body 120 lies against a first mechanical stop 30 at the first guiding element 26. In this first switch body position P1, the valuable documents are guided to the second transport path T2.

Figure 3:
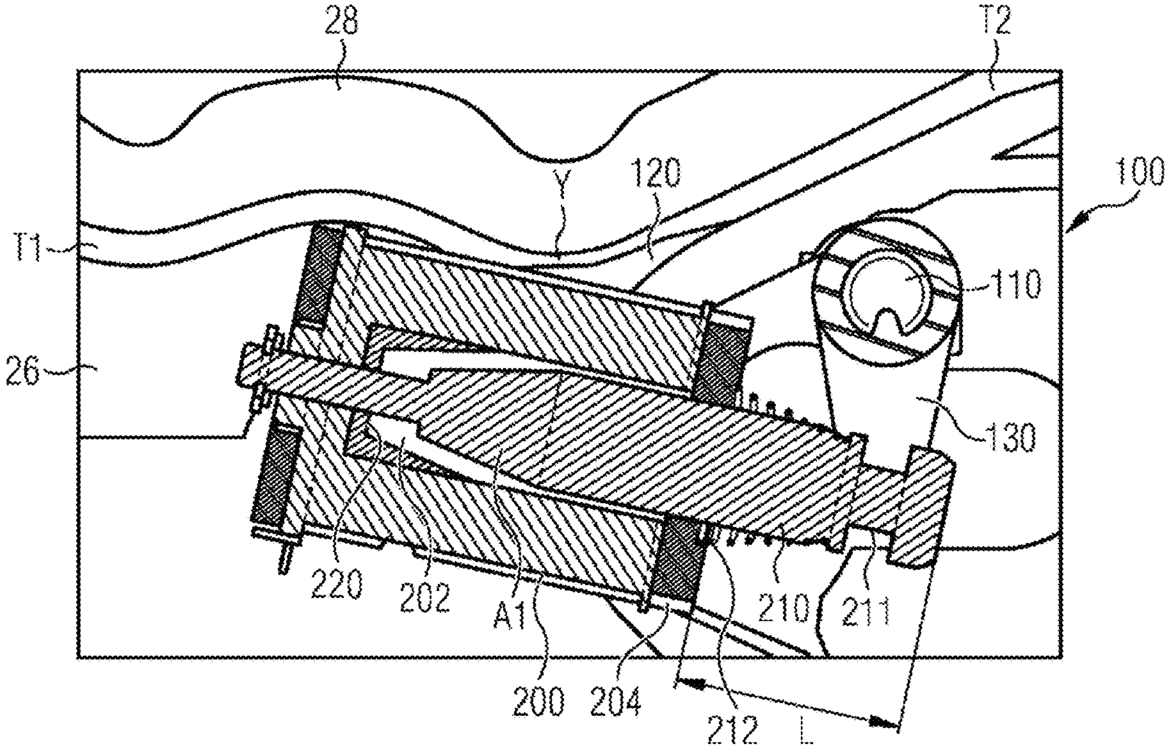
FIG. 3 shows a cutout of a sectional illustration of the first switch assembly according to FIG. 1 and FIG. 2.
Figure 4:
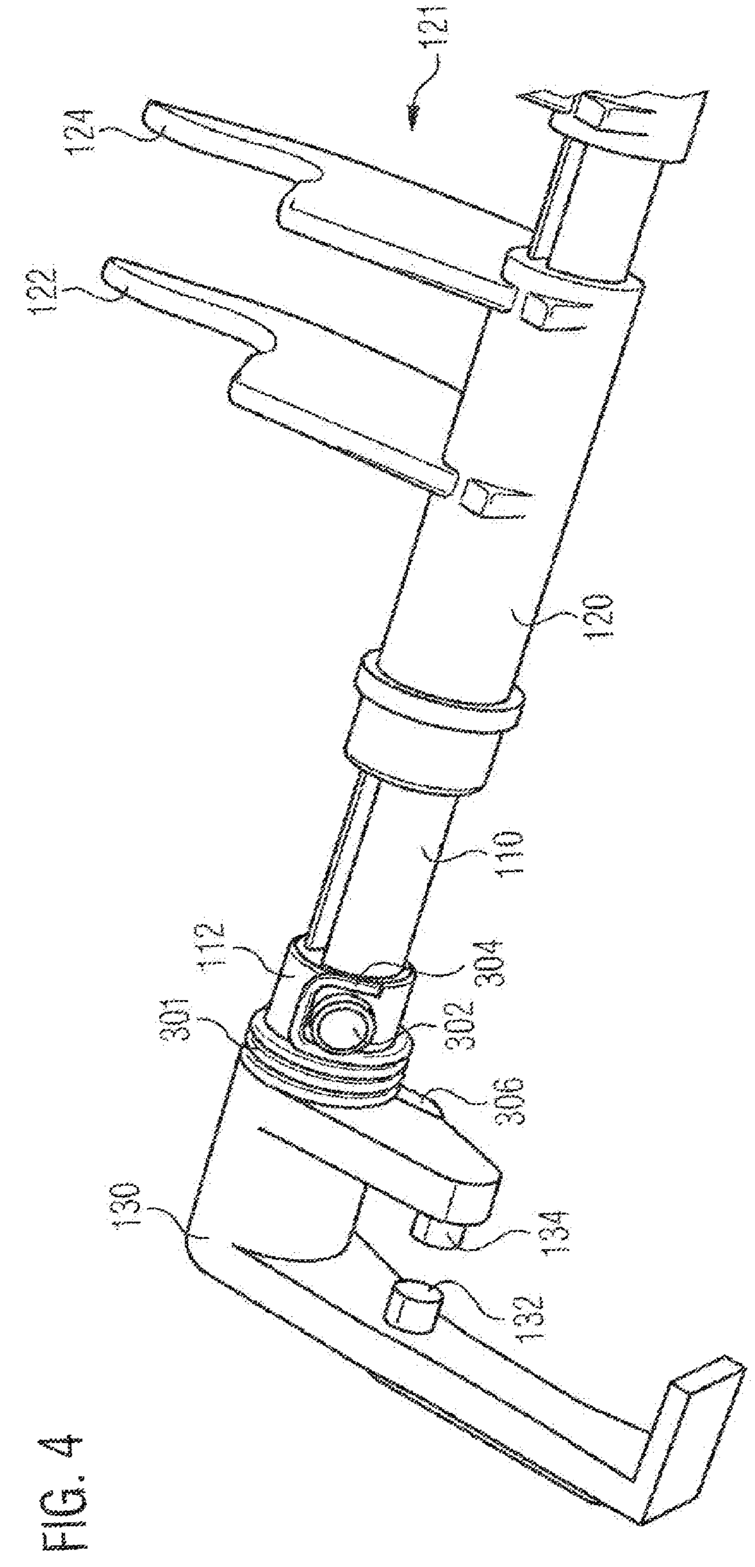
FIG. 4 shows a perspective illustration of individual elements of the first switch assembly according to FIGS. 1 to 3 according to a first embodiment.

FIG. 3 shows a cutout of a sectional illustration of the first switch assembly 100 according to FIGS. 1 and 2 along the sectional plane B which intersects the armature 210 along its longitudinal axis. The solenoid 200 is in engagement with the switch lever 130 via a groove 211 in an armature 210, wherein two switch lever fingers 132, 134 which are illustrated in FIG. 4 engage in the groove 211. A recess 202 for receiving the armature 210 is provided in the solenoid housing 204; the armature 210 is movable within the recess 202 as far as a mechanical armature stop 220. In the first operating state illustrated in FIG. 2 and FIG. 3, current does not flow through the coil of the solenoid 200, and the armature 210 is in a first armature position A1, in which the armature 210 protrudes by a distance L from the solenoid housing 204 of the solenoid 200. In this first armature position A1 of the armature 210, a conical spring 212 which is connected to the armature 210 and to the solenoid housing 204 is only slightly stressed, if at all. In other embodiments, a different spring, in particular a helical spring, can be used instead of the conical spring 212.

FIG. 4 shows a perspective illustration of individual elements of the first switch assembly 100 according to FIGS. 1 to 3 according to a first embodiment. A plug-on element 112 is pushed onto the shaft 110 and is in engagement with the shaft 110 in a form-fitting manner and thus for rotation therewith. The switch lever 130 has two lever fingers 132, 134 for engagement in the groove 211 of the armature 210. A bolt 302 is fixedly connected to the plug-on element 112 and is thereby in engagement with the shaft 110 for rotation therewith. A torsion spring 301 is connected in a prestressed manner at a first end 304 to the bolt 302 and at a second end 306 to the switch lever 130, wherein a force between 1N and 5N, in particular between 2.5N and 3N, corresponds to the prestress of said connection. FIG. 4 also shows a guiding element 121 which comprises two switch fingers 122, 124.

Figure 5:
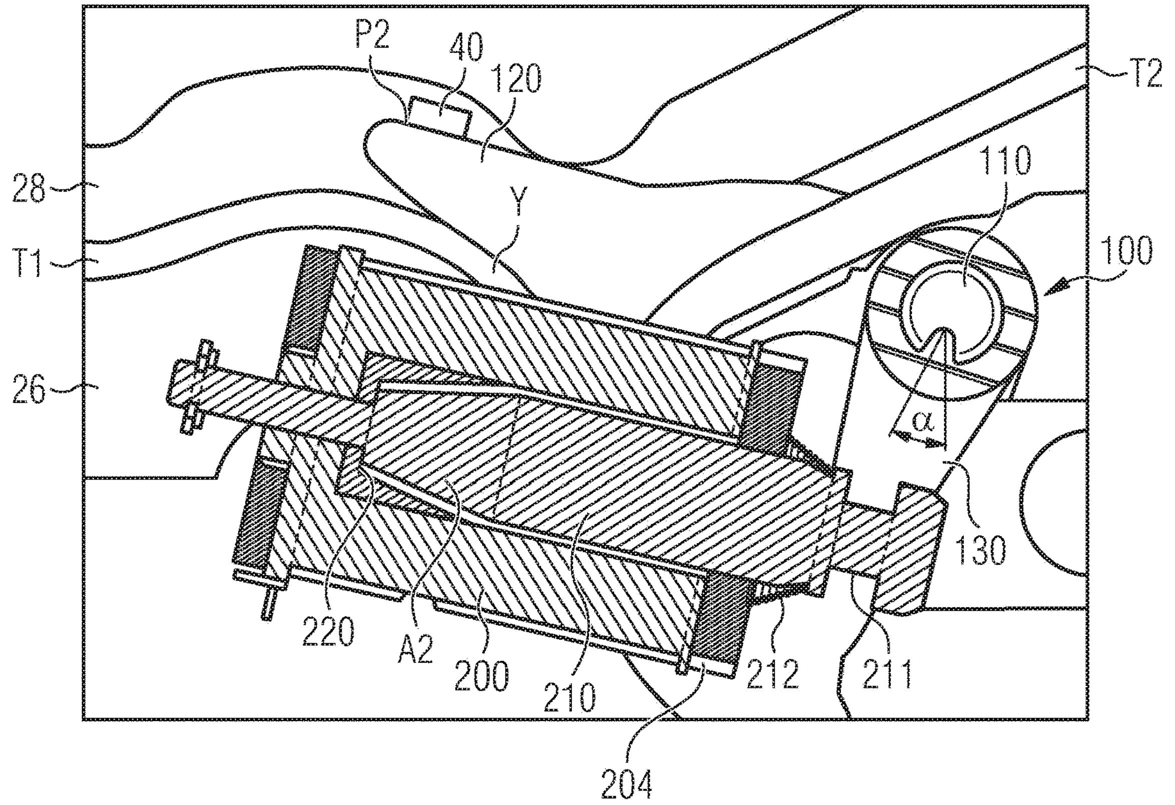
FIG. 5 shows a cutout of a sectional illustration of the first switch assembly.

FIG. 5 shows a cutout of a sectional illustration along the sectional plane B of the first switch assembly 100 according to the first embodiment. The switch assembly 100 is shown in a second operating state in which current flows through the coil of the solenoid 200. This generates a magnetic field by means of which the armature 210 is drawn into the solenoid housing 204. The armature 210 thereby moves from the first armature position A1 into a second armature position A2, in which the armature 210 lies against the mechanical stop 220. This movement of the armature 210 brings about a rotation of the switch lever 130 and of the shaft 110 about the longitudinal axis of the shaft 110 by an angle α in the range between 5° and 50°, in particular between 200 and 35°, for example of 30°.

The rotation also causes a movement of the switch body 120 from the first switch body position P1 shown in FIG. 2 into a second switch body position P2 which is shown in FIG. 5 and in which the switch body 120 lies against a second mechanical stop 40. In said second switch body position, the valuable documents are guided from the first transport path T1 into the third transport path T3 or in the opposite direction from the third transport path T3 into the first transport path T1. In the exemplary embodiment shown, the stop 40 is part of the guiding element 28. In other embodiments, a separate stop can be provided.

The switch body 120 reaches the second switch body position P2 before the armature 210 has reached the second armature position A2. During the movement of the armature 210 that takes place after the switch body 120 has reached the switch body position P2, the torsion spring 301 which is already prestressed is stressed further by the further movement of the armature 210. During said further movement of the armature, the switch lever 130 is rotated further by a predefined angle about the longitudinal axis of the shaft 110. In another embodiment of the invention, this angle has a value in the range between 3° and 10°, in particular between 5.5° and 7.5°, for example 6.5°. In an alternative embodiment, this angle has a value in the range between so and 15°, in particular between 100 and 13°, for example 11.5°.

In the second operating state shown in FIG. 5, both the conical spring 212 and the torsion spring 301 are prestressed, with the conical spring 212 being prestressed by approximately 3N to 4N. The prestressing force of the conical spring 212 and the prestressing force of the torsion spring 301 act in the same direction and bring about a rapid dropping of the armature 210, i.e. the return to the first armature position A1, as soon as no current flows through the coil at the solenoid 200.

Figure 6:
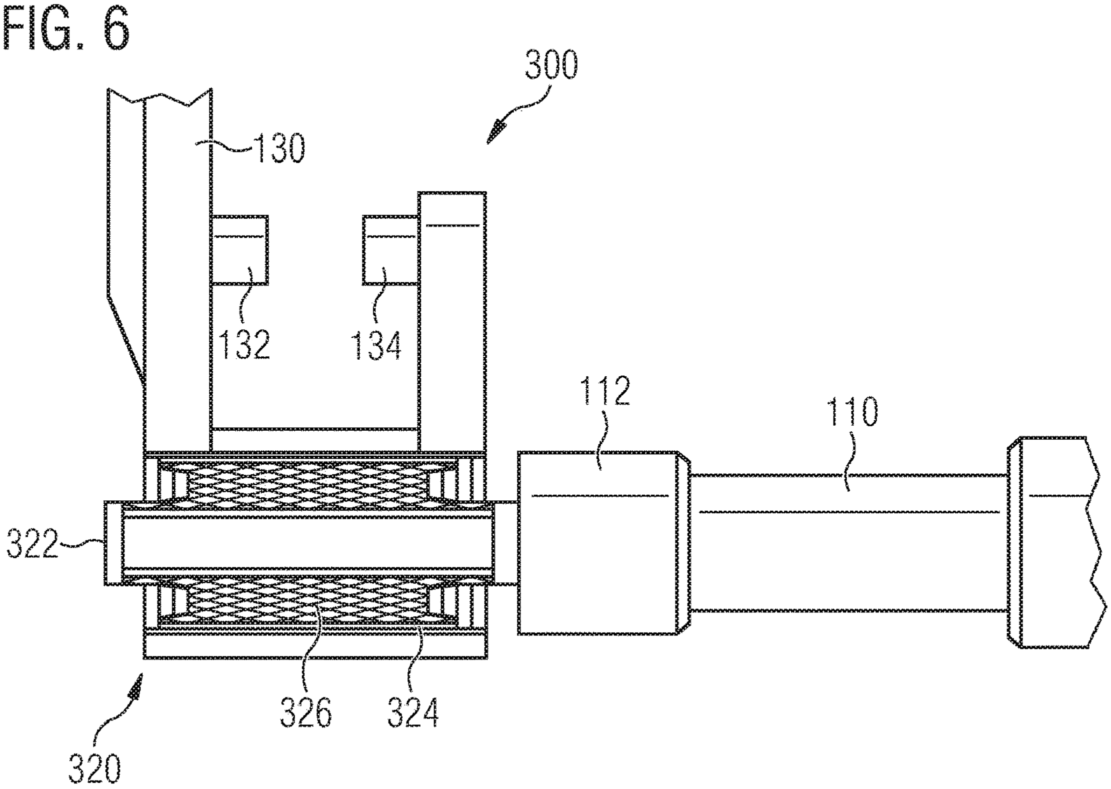
FIG. 6 shows a partially sectioned illustration of a section of a second switch assembly which can be used in place of the first switch assembly in the device.

FIG. 6 shows a partially sectioned illustration of a section of a second switch assembly 300 which can be used in the device 10 instead of the switch assembly 100. Elements of the same design or having the same function have the same reference signs. The switch assembly 300 comprises a torsion bushing 320 with a first sleeve 322, a second sleeve 324 and an elastically deformable elastomer element 326, wherein the first sleeve 322 is fixedly connected to the shaft 110 and the second sleeve 324 is fixedly connected to the switch lever 130. The sleeves 320 and 322 are connected to each other and rotatable relative to each other via the elastomer element 326. A movement of the armature 210 into the second armature position A2 is thus possible even if the switch body 120 has already reached the second switch body position P2 since a relative movement between the switch lever 130 and the shaft 110 is possible with the aid of the torsion bushing 320.

Figure 7:
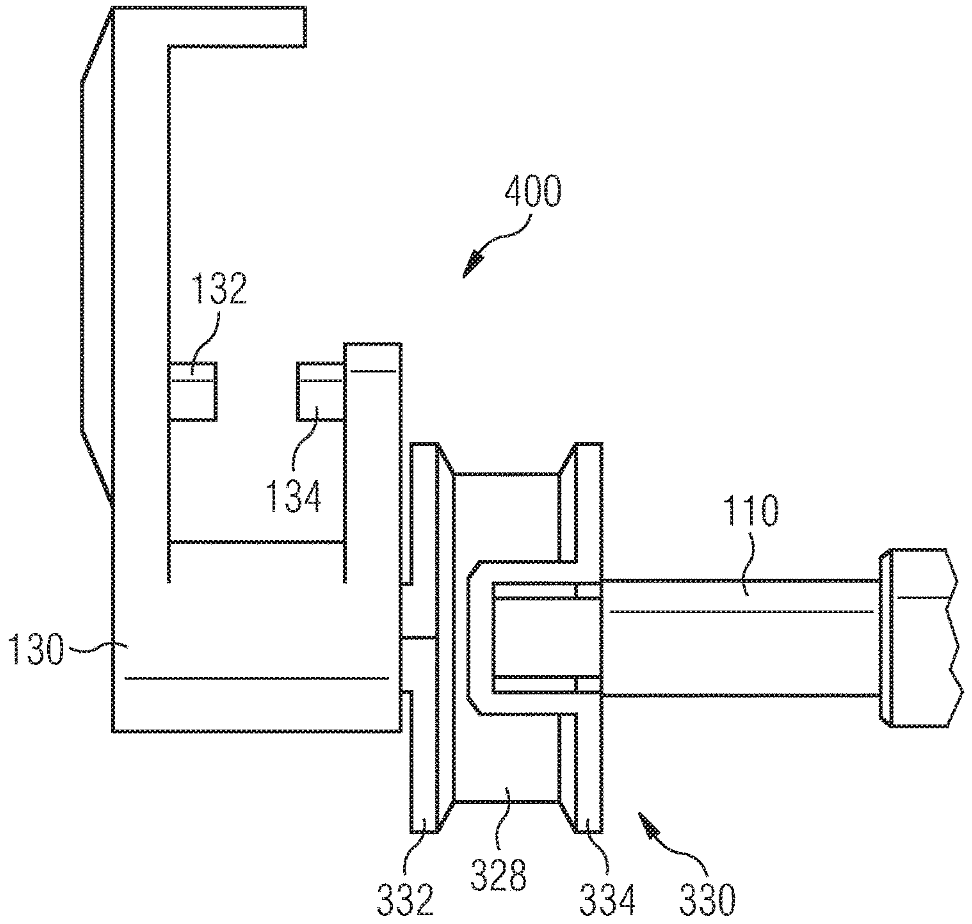
FIG. 7 shows a side view of a section of a third switch assembly which can be used instead of the first switch assembly in the device.

FIG. 7 shows a side view of a section of a third switch assembly 400 which can be used in the device 10 instead of the switch assembly 100. The switch assembly 400 comprises a torsion disk assembly 330 with a first disk 332 which is connected to the switch lever 130, with a second disk 334 which is connected to the shaft 110, and with an elastically deformable elastomer element 328. The disks 332 and 334 are connected to each other and rotatable relative to each other by means of the elastomer element 328. A movement of the armature 210 into the second armature position A2 is thus possible even if the switch body 120 has already reached the second switch body position P2 since a relative movement between the switch lever 130 and the shaft 110 is possible with the aid of the torsion disk assembly 330.

Figure 8:
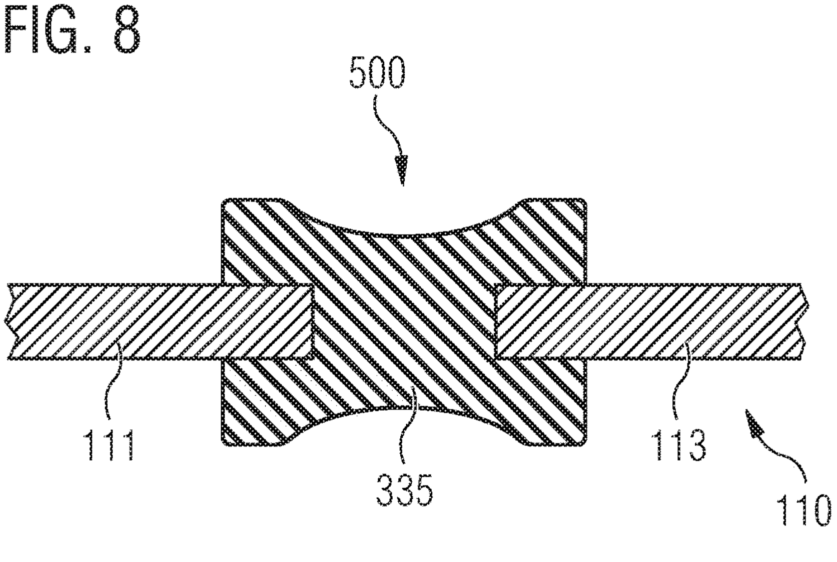
FIG. 8 shows a schematic sectional illustration of a section of a fourth switch assembly which can be used instead of the first switch assembly in the device.

FIG. 8 shows a schematic sectional illustration of a section of a fourth switch assembly 500 which can be used in the device 10 instead of the switch assembly 100.

The shaft 110 comprises a first shaft part 111 and a second shaft part 113 which are connected to each other and rotatable relative to each other with the aid of an elastically deformable elastomer element 335. The shaft part 111 is fixedly connected to the switch lever 130, and the shaft part 113 is fixedly connected to the switch body 120. A movement of the armature 210 into the second armature position A2 is thus possible even if the switch body 120 has already reached the second switch body position P2 since a relative movement of the shaft part 111 and the shaft part 112 is possible with the aid of the elastomer element 335. In an alternative embodiment, the shaft parts 111 and 113 can be connected to each other via a torsion spring.

Figure 9:
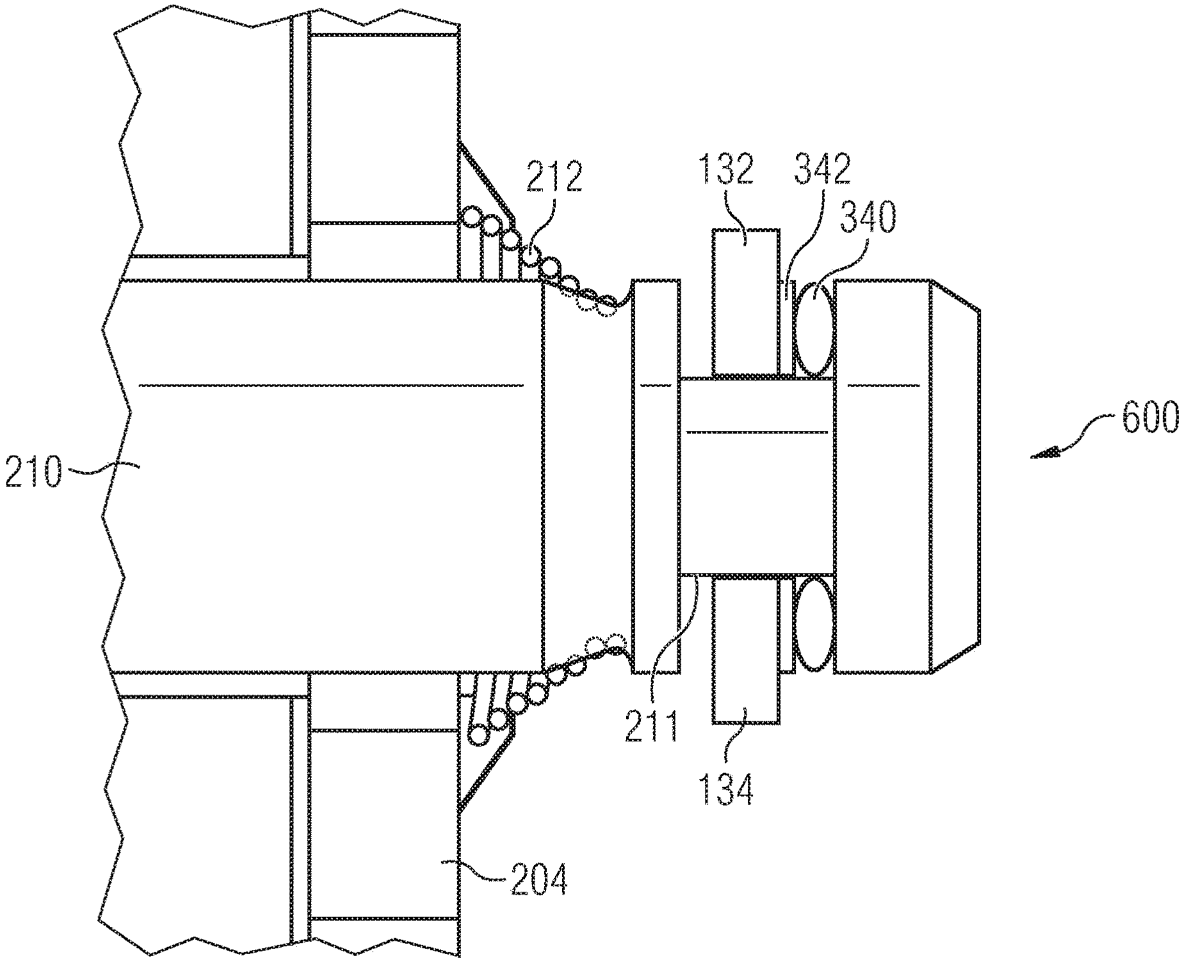
FIG. 9 shows a schematic illustration of a section of a fifth switch assembly which can be used instead of the first switch assembly in the device.

FIG. 9 shows a schematic illustration of a section of a fifth switch assembly 600 which can be used in the device 10 instead of the switch assembly 100. The switch lever fingers 132, 134 reach into the groove 211 of the armature 130. An O ring 340 is arranged in that side of the groove 211 which faces away from the solenoid housing 204. A spacer 342 is arranged between the switch lever fingers 132, 134 and the O ring 340. A movement of the armature 210 into the second armature position A2 is thus possible even if the switch body 120 has already reached the second switch body position P2 since the switch lever fingers 132, 134 press together the O ring 340 via the spacer 342 during the remaining stroke of the armature 210 such that the O ring 340 is elastically deformed. In alternative embodiments, the O ring 340 can be replaced by a soft wave washer, a disk spring or an elastomer washer.

Figure 10:
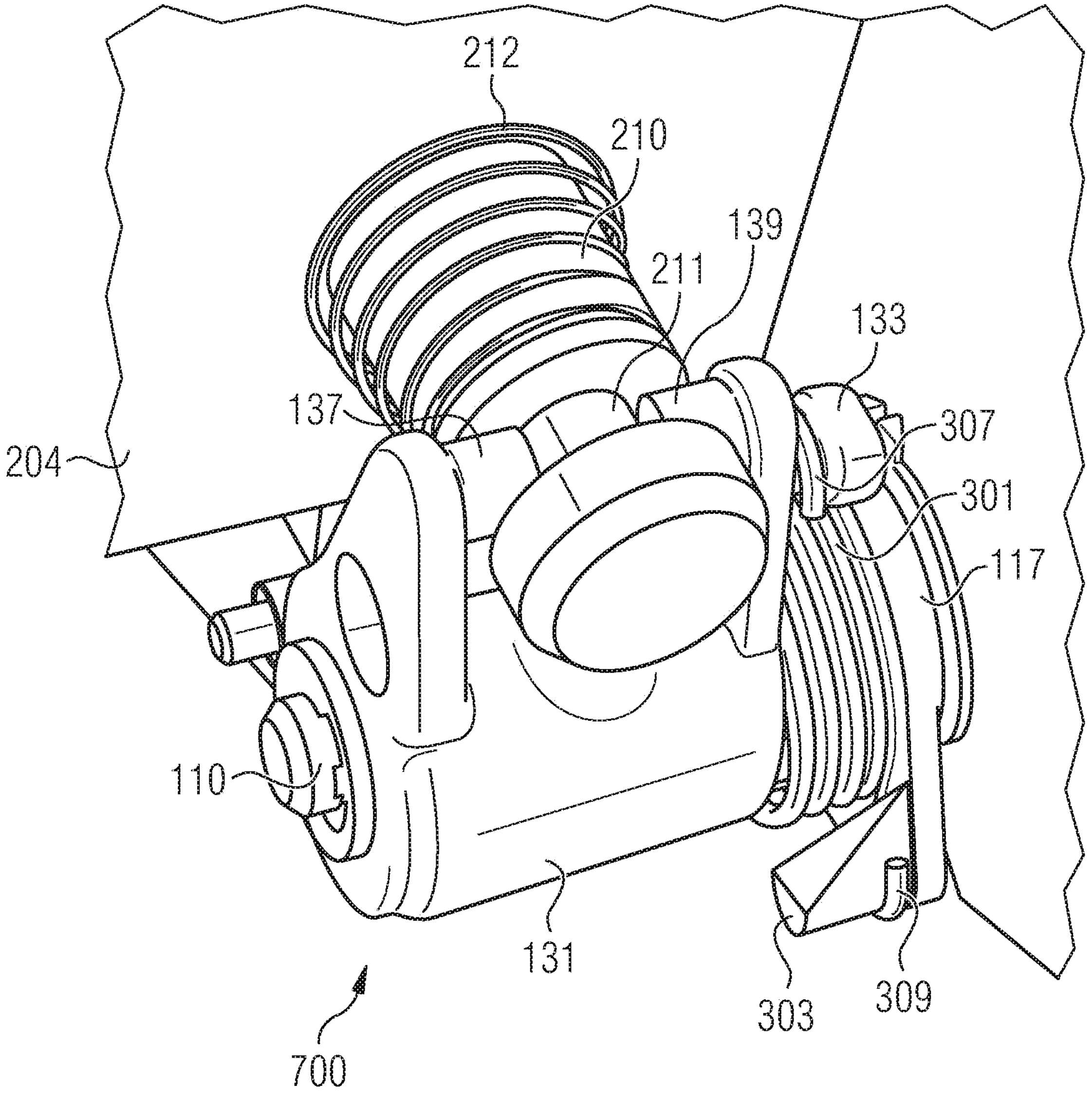
FIG. 10 shows a schematic illustration of a section of a sixth switch assembly which can be used instead of the first switch assembly in the device.

FIG. 10 shows a schematic illustration of a section of a sixth switch assembly 700 which can be used in the device 10 instead of the first switch assembly 100. The illustrated engagement of two switch lever fingers 137, 139 in the groove 211 of the armature 210 corresponds to the engagement of the switch lever fingers 132, 134 in the groove 211 of the armature 210 in the case of the switch assemblies 100 to 600 that have already been described. A torsion spring 301 is connected at one end 309 to a protruding segment 303 of a plug-on element 117. The plug-on element 117 is arranged on the shaft 110 in the same manner as the plug-on element 112 shown in FIG. 4. The other end 307 of the torsion spring 301 engages in a protruding segment 133 of the switch lever 131. A movement of the armature 210 into the second armature position A2 is thus possible even if the switch body 120 has already reached the second switch body position P2 since a relative movement between the switch lever 131 and the shaft 110 is possible counter to the spring force of the preferably prestressed torsion spring 301.

In a further alternative embodiment of the invention, the armature 210 comprises a first and a second section, wherein the switch lever 130 is in engagement with the first section, and wherein the first section and the second section are connected via an elastically deformable element, in particular via a compression spring. A movement of the armature 210 into the second armature position A2 is thus possible even if the switch body 120 has already reached the second switch body position P2 since the spring is stressed counter to the spring force during the remaining stroke of the armature 210.

In a further alternative embodiment of the invention, the switch body 120 comprises switch fingers which are connected elastically to the switch body 120. It is thus ensured that a movement of the armature 210 into the second armature position A2 is possible even if the switch body 120 has already reached the second switch body position P2 since a relative movement between the shaft and the switch fingers of the switch body is possible during the remaining stroke of the armature 210. In a further alternative embodiment of the invention, the switch fingers 120 themselves are elastically deformable, additionally or alternatively to an elastic connection to the switch body 120.

The invention claimed is:

1. A switch assembly for a device for handling valuable documents, comprising:

a switch body;

a shaft connected to the switch body for rotation therewith, wherein the switch body is rotatable about the longitudinal axis of the shaft between a first switch body position and a second switch body position;

a switch lever, wherein the shaft is rotatable about its longitudinal axis with the aid of the switch lever;

a solenoid which comprises an armature, wherein the solenoid is configured to be actuated such that the armature can be moved between a first armature position and a second armature position, wherein the switch lever is in engagement with the armature such that the movement of the armature causes the switch lever to rotate about the longitudinal axis of the shaft, wherein the switch assembly comprises an elastically deformable element, wherein the elastically deformable element is deformed at least whenever the switch body has reached the second switch body position and the armature has not yet reached the second armature position;

wherein the elastically deformable element is a torsion bushing which comprises two sleeves which are connected to each other by an elastomer element and are rotatable relative to each other, wherein the first sleeve is connected to the switch lever and the second sleeve is connected to the shaft, and wherein the switch lever is rotatable about an angular range.

2. The switch assembly as claimed in claim 1 wherein the elastically deformable element is deformed from the time at which the switch body has reached the second switch body position and the armature is still moved further as far as the second armature position.

3. The switch assembly as claimed in claim 1 wherein the armature in the second armature position reaches a mechanical stop provided in the solenoid.

4. A switch assembly for a device for handling valuable documents, comprising:

a switch body;

a shaft connected to the switch body for rotation therewith, wherein the switch body is rotatable about the longitudinal axis of the shaft between a first switch body position and a second switch body position;

a switch lever, wherein the shaft is rotatable about its longitudinal axis with the aid of the switch lever;

a solenoid which comprises an armature, wherein the solenoid is configured to be actuated such that the armature can be moved between a first armature position and a second armature position, wherein the switch lever is in engagement with the armature such that the movement of the armature causes the switch lever to rotate about the longitudinal axis of the shaft, wherein the switch assembly comprises an elastically deformable element, wherein the elastically deformable element is deformed at least whenever the switch body has reached the second switch body position and the armature has not yet reached the second armature position;

wherein the shaft is connected to the switch lever in a recess of the switch lever via an elastomer.

5. The switch assembly as claimed in claim 4 characterized in that the switch lever is rotatable on the shaft about a predefined angular range, and in that the elastically deformable element is a torsion spring, wherein one end of the torsion spring is connected to the shaft and the other end of the torsion spring is connected to the switch lever.

6. The switch assembly as claimed in claim 4, wherein the elastically deformable element is deformed from the time at which the switch body has reached the second switch body position and the armature is still moved further as far as the second armature position.

7. The switch assembly as claimed in claim 4, wherein the armature in the second armature position reaches a mechanical stop provided in the solenoid.

8. A switch assembly for a device for handling valuable documents, comprising:

a switch body;

a shaft connected to the switch body for rotation therewith, wherein the switch body is rotatable about the longitudinal axis of the shaft between a first switch body position and a second switch body position;

a switch lever, wherein the shaft is rotatable about its longitudinal axis with the aid of the switch lever;

a solenoid which comprises an armature, wherein the solenoid is configured to be actuated such that the armature can be moved between a first armature position and a second armature position, wherein the switch lever is in engagement with the armature such that the movement of the armature causes the switch lever to rotate about the longitudinal axis of the shaft, wherein the switch assembly comprises an elastically deformable element, wherein the elastically deformable element is deformed at least whenever the switch body has reached the second switch body position and the armature has not yet reached the second armature position;

wherein the elastically deformable element is a torsion disk assembly which comprises first and second disks which are connected to each other by an elastomer element and are rotatable relative to each other, wherein the first disk is connected to the switch lever and the second disk is connected to the shaft.

9. The switch assembly as claimed in claim 8, wherein the elastically deformable element is deformed from the time at which the switch body has reached the second switch body position and the armature is still moved further as far as the second armature position.

10. The switch assembly as claimed in claim 8, wherein the armature in the second armature position reaches a mechanical stop provided in the solenoid.

11. A switch assembly for a device for handling valuable documents, comprising:

a switch body;

a shaft connected to the switch body for rotation therewith, wherein the switch body is rotatable about the longitudinal axis of the shaft between a first switch body position and a second switch body position;

a switch lever, wherein the shaft is rotatable about its longitudinal axis with the aid of the switch lever;

a solenoid which comprises an armature, wherein the solenoid is configured to be actuated such that the armature can be moved between a first armature position and a second armature position, wherein the switch lever is in engagement with the armature such that the movement of the armature causes the switch lever to rotate about the longitudinal axis of the shaft, wherein the switch assembly comprises an elastically deformable element, wherein the elastically deformable element is deformed at least whenever the switch body has reached the second switch body position and the armature has not yet reached the second armature position;

wherein the shaft comprises a first shaft part and a second shaft part, wherein the first shaft part and the second shaft part are connected to each other with the elastically deformable element and are rotatable relative to each other, and the switch lever is connected to the first shaft part for rotation therewith.

12. The switch assembly as claimed in claim 11, wherein the elastically deformable element is deformed from the time at which the switch body has reached the second switch body position and the armature is still moved further as far as the second armature position.

13. The switch assembly as claimed in claim 11, wherein the armature in the second armature position reaches a mechanical stop provided in the solenoid.

14. The switch assembly as claimed in claim 11, characterized in that the switch lever is rotatable on the shaft about a predefined angular range, and in that the elastically deformable element is a torsion spring, wherein one end of the torsion spring is connected to the shaft and the other end of the torsion spring is connected to the switch lever.

15. A switch assembly for a device for handling valuable documents, comprising:

a switch body;

a shaft connected to the switch body for rotation therewith, wherein the switch body is rotatable about the longitudinal axis of the shaft between a first switch body position and a second switch body position;

a switch lever, wherein the shaft is rotatable about its longitudinal axis with the aid of the switch lever;

a solenoid which comprises an armature, wherein the solenoid is configured to be actuated such that the armature can be moved between a first armature position and a second armature position, wherein the switch lever is in engagement with the armature such that the movement of the armature causes the switch lever to rotate about the longitudinal axis of the shaft, wherein the switch assembly comprises an elastically deformable element, wherein the elastically deformable element is deformed at least whenever the switch body has reached the second switch body position and the armature has not yet reached the second armature position;

wherein the solenoid comprises a solenoid housing, and in that the switch lever engages in a groove of the armature, wherein the elastically deformable element is arranged between the switch lever and a flange of the groove, the flange facing toward the stop.

16. The switch assembly as claimed in claim 15, wherein a spacer is arranged between the switch lever and the elastically deformable element, wherein the elastically deformable element is a wave washer, a disk spring, an elastomer washer or an O ring.

17. The switch assembly as claimed in claim 15, wherein the elastically deformable element is deformed from the time at which the switch body has reached the second switch body position and the armature is still moved further as far as the second armature position.

18. The switch assembly as claimed in claim 15, wherein the armature in the second armature position reaches a mechanical stop provided in the solenoid.

19. The switch assembly as claimed in claim 15, characterized in that the switch lever is rotatable on the shaft about a predefined angular range, and in that the elastically deformable element is a torsion spring, wherein one end of the torsion spring is connected to the shaft and the other end of the torsion spring is connected to the switch lever.

20. The switch assembly as claimed in one of claims 1, 4, 8, 11 or 15, wherein the elastically deformable element presses the switch body against a first stop with a prestress, wherein the prestress can correspond to a force between 1N and 5N.

21. The switch assembly as claimed in claim 20, wherein the elastically deformable element is arranged and designed in such a manner that, after the prestress has been overcome, a force in the range between 0.05N and 0.15N is necessary per 1 cm stroke of the armature.

22. The switch assembly as claimed in claim 20, wherein the force is between 2.5N and 3N.

* * * * *